United States Patent
Ding et al.

(10) Patent No.: US 10,175,754 B2
(45) Date of Patent: Jan. 8, 2019

(54) TOUCH GLOVE AND SMART WEARABLE SYSTEM

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Xianlin Ding, Beijing (CN); Ting Zeng, Beijing (CN); Zhongzheng Yang, Beijing (CN); Ming Hu, Beijing (CN); Taofeng Xie, Beijing (CN); Juntao Chen, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 70 days.

(21) Appl. No.: 15/104,381

(22) PCT Filed: Dec. 17, 2015

(86) PCT No.: PCT/CN2015/097720
§ 371 (c)(1),
(2) Date: Jun. 14, 2016

(87) PCT Pub. No.: WO2017/004942
PCT Pub. Date: Jan. 12, 2017

(65) Prior Publication Data
US 2017/0192505 A1 Jul. 6, 2017

(30) Foreign Application Priority Data
Jul. 7, 2015 (CN) .......................... 2015 1 0397739

(51) Int. Cl.
*G06F 3/01* (2006.01)
*A41D 19/00* (2006.01)
(Continued)

(52) U.S. Cl.
CPC ........... *G06F 3/014* (2013.01); *A41D 19/001* (2013.01); *A41D 19/0024* (2013.01); *G06F 3/044* (2013.01); *G06F 3/0416* (2013.01)

(58) Field of Classification Search
CPC ........ G06F 3/014; G06F 3/0416; G06F 3/044; A41D 19/001
(Continued)

(56) References Cited

U.S. PATENT DOCUMENTS

| 2004/0036678 A1* | 2/2004 | Zngf ................. G06F 3/014 345/168 |
| 2010/0090966 A1* | 4/2010 | Gregorio ............ A41D 19/0024 345/173 |
| 2013/0106765 A1 | 5/2013 | Beecher et al. |

FOREIGN PATENT DOCUMENTS

| CN | 1766943 | * | 5/2006 |
| CN | 1766943 A | | 5/2006 |

(Continued)

OTHER PUBLICATIONS

Written Opinion of the International Searching Authority from corresponding PCT Application No. PCT/CN2015/097720, dated Apr. 22, 2016 (5 pages).
(Continued)

*Primary Examiner* — Mark Regn
(74) *Attorney, Agent, or Firm* — Harness, Dickey & Pierce, P.L.C.

(57) ABSTRACT

The present invention provides a touch glove and smart wearable system, wherein a contact area, at least one touch area, a control module and a signal transmission module are
(Continued)

disposed on the glove body; when the touch area is touched by the contact area, a control signal is generated and transmitted to a corresponding smart device, controlling it to perform a corresponding operation. Thus, control over the smart device may be achieved by only making one part of the touch glove touch another part without directly contacting the smart device, which is especially convenient when the smart device is inconvenient to be directly contacted; meanwhile operations over a plurality of smart devices may be integrated into the touch glove, control over each smart device may be achieved by only moving fingers instead of moving the smart device and the arms, and even blind operation may be achieved without using eyes.

17 Claims, 4 Drawing Sheets

(51) Int. Cl.
    *G06F 3/041*     (2006.01)
    *G06F 3/044*     (2006.01)

(58) Field of Classification Search
    USPC .......................................................... 345/174
    See application file for complete search history.

(56) References Cited

FOREIGN PATENT DOCUMENTS

| | | |
|---|---|---|
| CN | 202436175 U | 9/2012 |
| CN | 104011633 A | 8/2014 |
| CN | 105094322 A | 11/2015 |
| JP | 2008081896 A | 4/2008 |
| TW | I233819 B | 6/2005 |

OTHER PUBLICATIONS

Office Action from corresponding Chinese Application No. 201510397739.5, dated Mar. 20, 2017 (7 pages).
International Search Report from corresponding PCT Application No. PCT/CN2015/097720, dated Mar. 31, 2016 (5 pages).

\* cited by examiner

TOUCH GLOVE AND SMART WEARABLE SYSTEM

TECHNICAL FIELD

Embodiments of the present invention relate to the technical field of smart wearables, in particular to a touch glove and a smart wearable system.

BACKGROUND

Currently, smart devices are becoming increasingly richer in kinds and larger in quantity, and how to control these devices becomes a difficult problem. Especially with the emergence of the wearable devices which can be worn at different positions on a human body, the control over these devices becomes more and more difficult.

Currently, mobile phones are used to control on and off of various smart devices. However, with the size of the mobile phone becoming larger and larger, the operation becomes inconvenient. Especially when walking or conducting other activities, using a mobile phone to control the smart device becomes very inconvenient.

SUMMARY OF THE INVENTION

In view of the shortcomings in the prior art, embodiments of the present invention provide a touch glove and a smart wearable system, facilitating indirect contact control over a smart device.

In a first aspect, an embodiment of the present invention provides a touch glove, comprising a glove body, a contact area disposed on the glove body, at least one touch area, a control module and a signal transmission module;

The contact area is for touching the touch area;

each touch area is connected with the control module, and is for generating and transmitting a touch signal to the control module when the touch area is touched by the contact area;

the control module is connected with the signal transmission module, and is for generating a corresponding control signal according to the touch signal;

the signal transmission module is for receiving from the control module and transmitting the control signal.

According to one exemplary embodiment of the present invention, the contact area is disposed in the front half part of a thumb accommodation portion on the palm side of the glove body.

According to one exemplary embodiment of the present invention, the at least one touch area is disposed in the front half part of a finger accommodation portion other than the thumb on the palm side of the glove body accommodation portion or on the side of a forefinger accommodation portion adjacent to the thumb accommodation portion.

According to one exemplary embodiment of the present invention, the contact area comprises a conductor exposed out of the inner surface of the glove body.

According to one exemplary embodiment of the present invention, the conductor is exposed out of the outer surface of the glove body.

According to one exemplary embodiment of the present invention, the conductor is metal fibers woven in the glove body.

According to one exemplary embodiment of the present invention, the at least one touch area comprises a first insulating layer located on the inner surface of the glove body, a second insulating layer located on the outer surface of the glove body, and a touch device located between the first insulating layer and the second insulating layer.

According to one exemplary embodiment of the present invention, the touch device is a capacitive touch device.

According to one exemplary embodiment of the present invention, the touch device comprises a first electrode and a second electrode located on the same layer and insulated from each other; alternatively, the touch device comprises a first electrode layer, a second electrode layer, and a third insulating layer disposed between the first electrode layer and the second electrode layer.

According to one exemplary embodiment of the present invention, the control module is further for generating a corresponding touch signal according to any one of more of the touch area where the touch occurred, the touched position in the touch area, the touch trace and the number of successive touches.

According to one exemplary embodiment of the present invention, the signal transmission module is a wireless communication module.

According to one exemplary embodiment of the present invention, the touch glove further comprises a prompt module for prompting the control operation to be completed when the touch signal is transmitted or is about to be transmitted, or transmitting a prompt when a state signal of the smart device is received.

According to one exemplary embodiment of the present invention, the touch glove comprises two paired glove bodies, wherein one glove body is provided with the contact area, and the other glove body is provided with the at least one touch area, the control module and the signal transmission module.

In the second aspect, the embodiment of the present invention provides a smart wearable system, comprising the touch glove as described in the first aspect and at least one smart device, each smart device comprising a signal transceiving module and an execution module, the signal transceiving module being for receiving the control signal, and the execution module being for executing corresponding operation according to the touch signal.

According to the above technical solution, a touch glove and a smart wearable system are provided by the present invention, wherein a contact area, at least one touch area, a control module and a signal transmission module are provided on the glove body, and a control signal is generated and transmitted to the corresponding smart device when the touch area is touched by the contact area, thus controlling the smart device to perform a corresponding operation. In this way, the control over the corresponding smart device can be achieved by only making one part of the touch glove touch another part without directly contacting the smart device, which is especially convenient when the smart device is inconvenient to be directly contacted during walking or conducting other activities; meanwhile the operations over a plurality of smart devices can be integrated into the touch glove, and the control over each smart device can be achieved by only moving fingers instead of moving the smart device and the arms, and even a blind operation can be achieved without using eyes, thus bringing better operation experience for the user.

DETAILED DESCRIPTION OF PREFERRED EMBODIMENTS

Specific implementations of the present invention will be further described hereafter in conjunction with the drawings. The following embodiments are only used to illustrate the technical solution of the present invention, and not to limit the scope of protection of the present invention.

Figure 1:
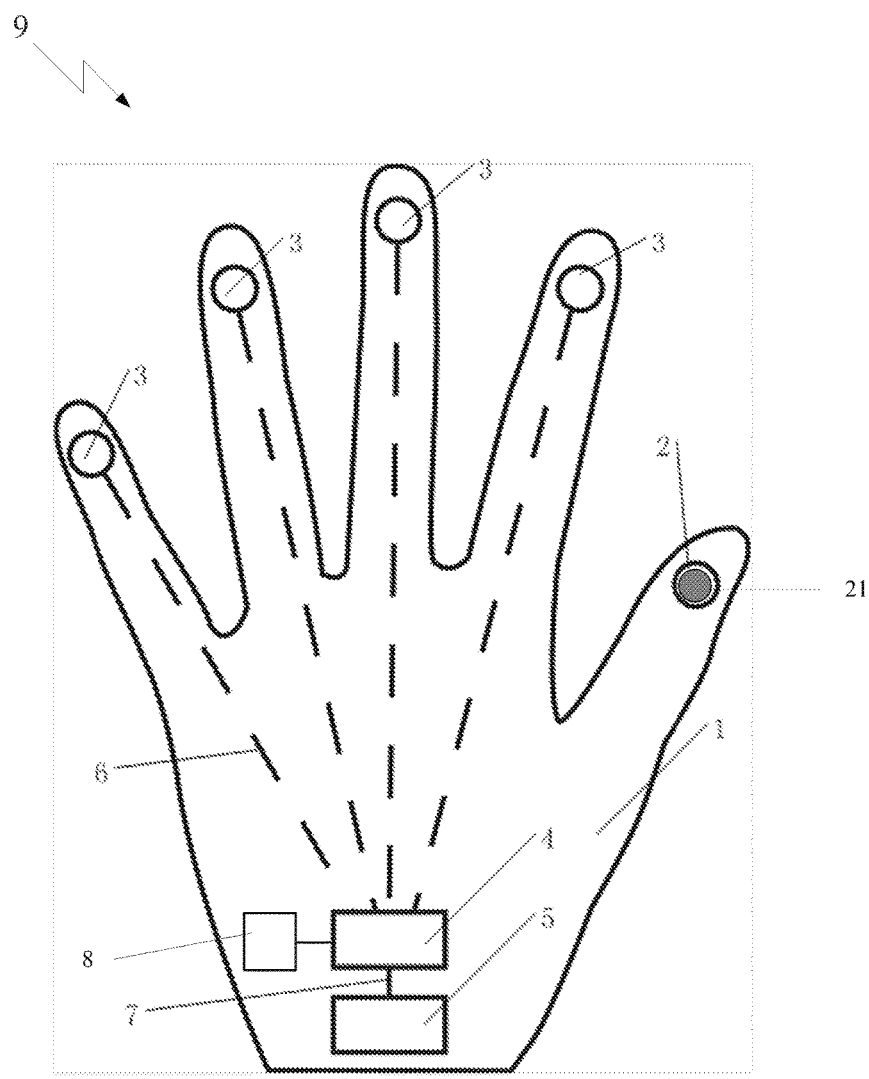
FIG. 1 is a structural schematic diagram of a touch glove provided by a first embodiment of the present invention.

A first embodiment of the present invention provides a touch glove 9, as shown in FIG. 1, comprising a glove body 1, a contact area 2 disposed on the glove body 1, at least one touch area 3, a control module 4 and a signal transmission module 5. It should be understood that the shapes, sizes and locations of the contact area, touch area, control module and signal transmission module in the drawings are all shown schematically, and may be designed according to practical requirements.

The contact area 2 is for touching the touch area 3; each touch area 3 is connected with the control module 4, and is for generating and transmitting a touch signal to the control module 4 when the touch area 3 is touched by the contact area 2; the control module 4 is connected with the signal transmission module 5, and is for generating a corresponding control signal according to the touch signal; and the signal transmission module 5 is for receiving from the control module 4 and transmitting a control signal.

As shown in FIG. 1, each touch area 3 is connected with the control module 4 by a respective connecting wire 6 (represented by a broken line); the control module 4 is connected with the signal transmission module 5 through a connecting wire 7; the connecting wire may be an ordinary conducting wire, and of course may also be a flexible flat cable, a flexible circuit board or the like. The control module 4 and the signal transmission module 5 may also be disposed on one flexible circuit board.

The touch glove 9 is for controlling a smart device outside the glove. When the contact area touches a touch area and generates a corresponding control signal, the corresponding smart device receives the control signal and performs a corresponding responsive operation according to the control signal, thus conveniently achieving the indirect contact control over the smart device outside the glove by only touching the corresponding touch area of the touch glove with the contact area. In this way, the control over the corresponding smart device can be achieved by only touching one part of the touch glove with another part thereof without directly contacting the smart device, which is especially convenient when the smart device is inconvenient to be directly contacted during walking or conducting other activities; meanwhile the operations on a plurality of smart devices can be integrated into the touch glove, and the control over each smart device can be achieved by only moving fingers instead of moving the smart device and the arm, and even blind operations can be achieved without using eyes, thus bringing better operation experience to the user.

The glove body 1 generally comprises finger accommodation portions and a palm accommodation portion. As shown in FIG. 1, the five finger accommodation portions are all separate finger accommodation portions, but in other embodiments, the other four finger accommodation portions than the thumb accommodation portion may be formed as an integral accommodation portion. FIG. 1 shows that they are closed finger accommodation portions, while in other embodiments, the finger accommodation portions may also be truncated type (i.e. the front end of the finger is exposed). The main material of the glove body 1 may be flexible insulating material such as ordinary cloth, wool, leather, plastic, in which or on which the contact area 2, the touch area 3, the control module 4 and the signal transmission module 5 can be conveniently disposed.

As shown in FIG. 1, the contact area 2 is disposed in the front half part of the thumb accommodation portion on the palm side (opposed to the back of the hand side) of the glove body 1, while at least one touch area 3 is disposed in the front half part of a finger accommodation portion other than the thumb accommodation portion on the palm side of the glove body 1 or on the side of the forefinger accommodation portion adjacent to the thumb accommodation portion. In this way, after wearing the glove 9, the contact area 2 on the thumb accommodation portion 1 of the glove body 1 may conveniently touch the touch area 3 on the other finger accommodation portions as needed by only moving the thumb and/or the other corresponding finger.

Figure 3A:
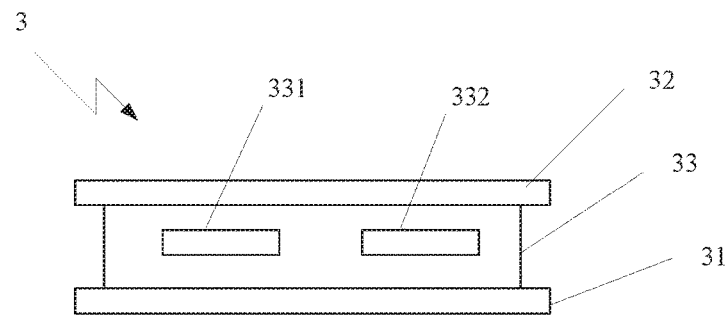
FIG. 3A is a structural schematic diagram of a touch area according to another embodiment of the present invention.

The number of the touch areas 3 disposed on the glove body 1 may be determined according to practical requirements. Referring to FIG. 3A, a structural schematic diagram of a touch area provided by some embodiments of the present invention, and FIG. 3B, a structural schematic diagram of a touch area provided by some other embodiments of the present invention, each touch area 3, for example, comprises a first insulating layer 31 located on the inner surface of the glove body 1, a second insulating layer 32 located on the outer surface of the glove body, and a touch device 33 located between the first insulating layer 31 and the second insulating layer 32. One or both of the first insulating layer 31 and the second insulating layer 32 may be the insulating material layer provided on the glove body 1 itself, or may be an additional material layer. The barrier of the first insulating layer 31 and the second insulating layer 32 can prevent the touch device 33 from directly contacting the hand, thus affecting the touch sensitivity. The touch device 33 may be a resistive, capacitive, or other suitable type touch device, and preferably a capacitive touch device. This is because the resistive touch device may produce touch control by only squeezing, and thus is easy to have mistaken touch by making a first or touching other objects. In contrast, the capacitive touch device needs to contact suitable substance to generate a touch signal, and as such the contact area 2 on the glove 9 may be made to include a conductor 21 which is exposed out of the inner surface of the glove body 1. In this way, when the user wears the glove 9, the conductor 21 contacts the human body; and when the contact area 2 touches the touch area 3, the capacitance of the capacitive touch device 33 in the touch area 3 will change, thus generating a touch signal and transmitting it to the control module 4; and the control module 4 generates a control signal according to the touch signal. When the conductor 21 is exposed out of the outer surface of the glove body 1, the touch area 3 can be directly touched, thus leading to a higher touch sensitivity. The conductor 21 may be, for example, metal fibers woven in the glove body, thus avoiding a protruding foreign object type conductor, and bringing about a more comfortable hand touch feel.

Figure 3B:
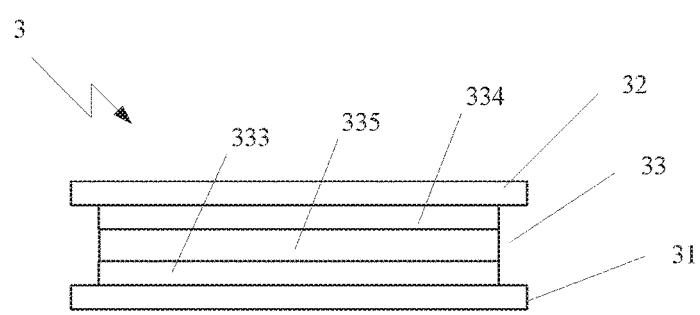
FIG. 3B is a structural schematic diagram of a touch area according to another embodiment of the present invention.

As shown in FIG. 3A, in some embodiments, the touch device 33 comprises a first electrode 331 and a second electrode 332 located on the same layer and insulated from each other; alternatively, as shown in FIG. 3B, in some other embodiments, the touch device 33 comprises a first electrode layer 333, a second electrode layer 334 and a third insulating layer 335 disposed between the first electrode layer 333 and the second electrode layer 334. As is known to those skilled in the art, both ways may form a capacitive touch device. Obviously, the former is lighter and thinner, while the latter is easier to manufacture, so a choice may be made according to particular requirements. The first electrode layer 333 and the second electrode layer 334, for example, may be made of indium tin oxide.

Figure 4:
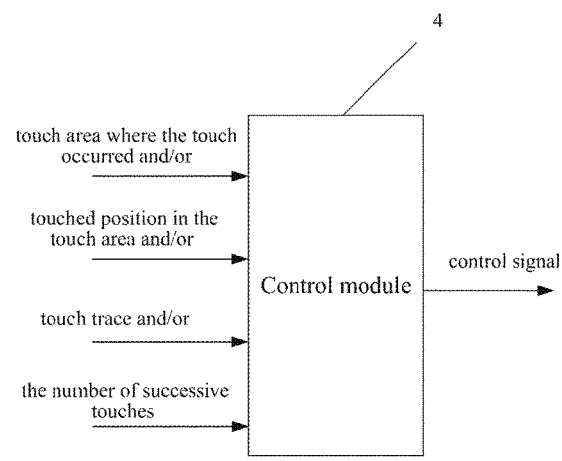
FIG. 4 is a schematic diagram of the functions of the control module according to another embodiment of the present invention.

Referring to FIG. 4, a schematic diagram of the functions of the control module according to some embodiments of the present invention, the control module 4 generates a corresponding control signal according to the touch area where the touch occurred, the touched position in the touch area, the touch trace and/or the number of successive touches. For example, when a touch area is touched, the control module 4 may determine which touch area is touched according to which of its ports connected with the touch areas transmits the touch signal, and generate a corresponding control signal. For example, it may determine a corresponding controlled smart device through the specific touch area being touched, and generating a corresponding control signal for controlling the smart device according to the touched position, the touch trace and/or the number of successive touches. It should be understood that the control module 4 may be a functional device, e.g. touch chip (Touch IC), comprising a processor or a programmable logic controller, and corresponding software and/or firmware. The control module 4 may be a whole integrated module, or may be a plurality of sub-modules performing functions separately, each sub-module being corresponding to a touch area or a plurality of adjacent touch areas.

The signal transmission module 5 is preferably a wireless communication device, e.g. Bluetooth device, WiFi device or the like, and may comprise a plurality of wireless communication devices for improving the compatibility.

The control module 4 and the signal transmission module 5 may be disposed at any suitable position of the glove body 1, e.g., on the back of the hand, to avoid being bumped and damaged.

The touch glove 9 of the embodiment may further comprise a prompt module 8 for prompting the control operation to be completed when the touch signal is transmitted or is about to be transmitted, or sending a prompt when a state signal of the smart device is received. The prompt module 8, for example, may comprise a sounding device, a display screen, an indicator light or the like. The prompt module 8 may be controlled by the control module 4 to perform its operation, or may be provided with a controller to perform a prompt operation according to the signal received from the signal transmission module. For example, if a smart device is missing and the prompt module 8 cannot receive signals from the smart device for a certain time, then the prompt module 8 may make a sound or flash the indicator light to notify the missing of the smart device.

Of course, the touch glove 9 of the embodiment may further comprise other functional modules according to practical requirements, such as a power supply module, details of which are not given here.

Figure 2:
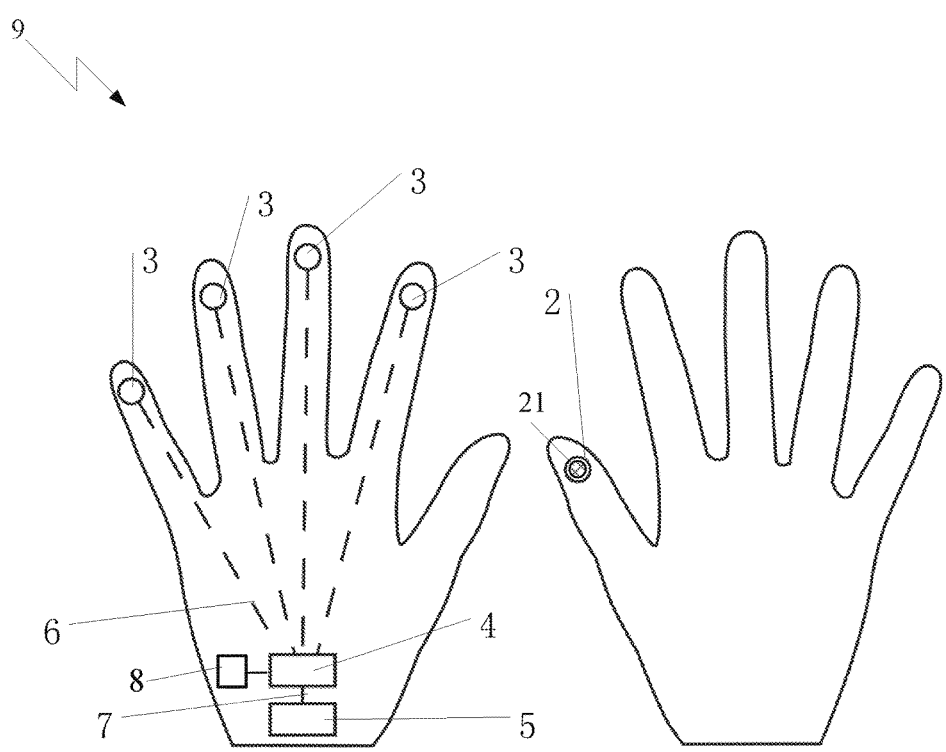
FIG. 2 is a structural schematic diagram of a touch glove provided by a second embodiment of the present invention.

As shown in FIG. 2, in a second embodiment of the present invention, the touch glove comprises two paired glove bodies, wherein one glove body is provided with a contact area 2, and the other glove body is provided with at least one touch area 3, a control module 4 and a signal transmission module 5. This configuration distributes the contact area and the touch area on different gloves, thus can better avoid mistaken touch. In the second embodiment, apart from the contact area 2 and the touch area 3, the control module 4 and the signal transmission module 5 being respectively disposed on different glove bodies, the other configurations are similar to those in the first embodiment, details of which are not given here.

Figure 5:
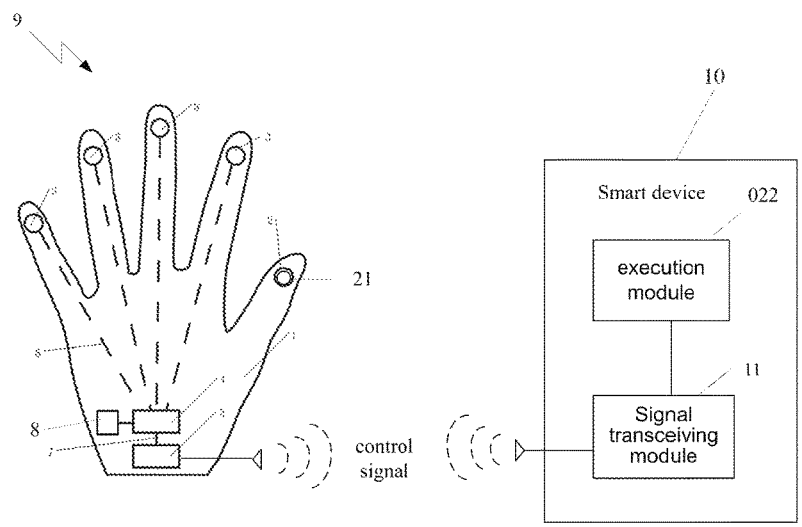
FIG. 5 is a structural schematic diagram of a smart wearable system according to another embodiment of the present invention.

Referring to FIG. 5, a structural schematic diagram of a smart wearable system provided by a third embodiment of the present invention, the third embodiment of the present invention provides a smart wearable system, comprising the touch glove 9 in the first embodiment or the second embodiment and at least one smart device 10, each smart device 10 comprising a signal transceiving module 11 and an execution module 022, the signal transceiving module 11 being for receiving a control signal transmitted by the signal transmission module 5 of the touch glove 9, and the execution module 022 being for executing a corresponding operation according to the control signal. The signal transceiving module 11 may be, for example, a wireless communication device in the smart device 10, and the execution module 022 may be a controller or another functional device in the smart device 10. When the signal transceiving module 11 receives a control signal transmitted by the signal transmission module 5 of the touch glove 9, the signal transceiving module 11 or the execution module 022 may identify the control signal. If identified as a valid instruction for the smart device, then the control signal will be converted into a native control instruction, and the execution module 022 will execute a corresponding operation.

The smart device 10 may be a Bluetooth headset, smart glasses or the like. It should be understood that any electronic device capable of receiving a control signal from the touch glove 9 of the present invention and performing a corresponding operation belongs to the "smart device" mentioned in the present invention. For example, when the smart device 10 comprises a Bluetooth headset and smart glasses, the Bluetooth headset may be activated to answer a phone call by making the contact area 2 of the thumb accommodation portion touch the touch area 3 of the forefinger accommodation portion; the volume may be increased by horizontally (perpendicular to the finger length direction) sweeping across the touch area 3 of the forefinger accommodation portion; the volume may be decreased by vertically (parallel to the finger length direction) sweeping across the touch area 3 of the forefinger accommodation portion; the smart device may be turned off by successively double-clicking the touch area 3 of the forefinger accommodation portion; the camera of the smart glasses may be activated by making the contact area 2 of the thumb accommodation portion touch the touch area 3 of the middle finger accommodation portion; the focal length may be increased by horizontally sweeping across the touch area 3 of the middle finger accommodation portion; the focal length may be decreased by vertically sweeping across the touch area 3 of the middle finger accommodation portion; and the glasses may be turned off by successively double-clicking the touch area 3 of the middle finger accommodation portion.

In the description of the present invention, numerous specific details are presented. However, it should be understood that embodiments of the present invention may be practiced without these specific details. In some instances, well known methods, structures and techniques are not described in detail, so as not to obscure the understanding of the description.

Unless stated otherwise, all the technical terms and scientific terms used in the disclosure should have the ordinary meaning as understood by those skilled in the art to which the present invention belong. The terms "first", "second" and other similar phases used in the disclosure do not denote any order, quantity or importance, and are only used to distinguish between different components. The words "comprise", "include" and other similar words denote that the element or object preceding the word encompasses the element or object or equivalents thereof enlisted following the word, while does not exclude other elements or objects. The terms "connect" or "connected with" or other similar words are not limited to physical or mechanical connections, and may comprise electrical connection, either directly or indirectly.

It should be explained finally is that the embodiments of the present invention are given by way of illustration only, and are not to limit the present invention. Although the present invention is described in detail with reference to the embodiments, those of ordinary skill in the art will understand that: the technical solutions stated in the embodiments may still be modified, or the whole or a part of the technical features may be equivalently substituted; and these modifications or substitutions do not deviate the essence of the corresponding technical solutions from the scope of the technical solutions according to the embodiments of the present invention, which should all be included within the scope of the claims and description of the present invention.

The invention claimed is:

1. A touch glove, comprising:
    a glove body including a plurality of finger accommodation portions, each of the plurality of finger accommodation portions including a touch area;
    a contact area disposed on the glove body;
    a control module; and
    a signal transmission module; wherein:
    each touch area is connected with the control module to generate and transmit a touch signal to the control module when the touch area is touched by the contact area;
    the control module is connected with the signal transmission module to generate a corresponding control signal according to the touch signal;
    the signal transmission module is connected to receive the control signal from the control module and to transmit the control signal;
    each touch area comprises a first insulating layer located on an inner surface of its corresponding one of the plurality of finger accommodation portions, a second insulating layer located on an outer surface of its corresponding one of the plurality of finger accommodation portions, and a capacitive touch device located between the first insulating layer and the second insulating layer; and
    the capacitive touch device includes a first electrode and a second electrode located on the same layer and insulated from one another, or the capacitive touch device includes a first electrode layer, a second electrode layer and a third insulating layer positioned between the first electrode layer and the second electrode layer.

2. The touch glove according to claim 1, wherein the contact area is disposed in a front half part of a thumb accommodation portion on a palm side of the glove body.

3. The touch glove according to claim 1, wherein each touch area is disposed in a front half part of its corresponding one of the plurality of finger accommodation portions other than a thumb accommodation portion on a palm side of the glove body, or on a side of a forefinger one of the plurality of plurality of finger accommodation portions adjacent to the thumb accommodation portion.

4. The touch glove according to claim 1, wherein, the contact area comprises a conductor exposed out of the inner surface of the glove body.

5. The touch glove according to claim 4, wherein, the conductor is exposed out of the outer surface of the glove body.

6. The touch glove according to claim 4, wherein, the conductor includes metal fibers woven in the glove body.

7. The touch glove according to claim 1, wherein the control module is connected to generate a corresponding touch signal according to one of the touch areas where a touch occurred, a touched position in one of the touch areas, a touch trace and a number of successive touches.

8. The touch glove according to claim 1, further comprising a prompt module for prompting a control operation to be completed when the touch signal is transmitted or is about to be transmitted, or transmitting a prompt when a state signal of a smart device is received.

9. The touch glove according to claim 1, wherein, the touch glove comprises two paired glove bodies including said glove body, wherein one glove body includes the contact area, and the other glove body includes the touch areas, the control module and the signal transmission module.

10. A smart wearable system, comprising the touch glove as described in claim 1 and at least one smart device, the smart device comprising a signal transceiving module for receiving the control signal, and an execution module for executing a corresponding operation according to the control signal.

11. The smart wearable system according to claim 10, wherein, the contact area is disposed in a front half part of a thumb accommodation portion on a palm side of the glove body.

12. The smart wearable system according to claim 10, wherein each touch area is disposed in a front half part of its corresponding one of the plurality of finger accommodation portions other than a thumb accommodation portion on a palm side of the glove body, or on a side of its corresponding forefinger one of the plurality of plurality of finger accommodation portions adjacent to the thumb accommodation portion.

13. The smart wearable system according to claim 10, wherein, the contact area comprises a conductor exposed out of the inner surface of the glove body.

14. The smart wearable system according to claim 10, wherein, the control module is connected to generate a corresponding touch signal according to one of the touch areas where a touch occurred, a touched position in one of the touch areas, a touch trace and a number of successive touches.

15. The smart wearable system according to claim 10, wherein, the touch glove further comprises a prompt module for prompting a control operation to be completed when the touch signal is transmitted or is about to be transmitted, or transmitting a prompt when a state signal of the smart device is received.

16. The smart wearable system according to claim 10, wherein, the touch glove comprises two paired glove bodies including said glove body, wherein one glove body includes the contact area, and the other glove body includes the touch areas, the control module and the signal transmission module.

17. The touch glove according to claim 1, wherein the plurality of finger accommodation portions include a thumb accommodation portion and finger accommodation portions than the thumb accommodation portion, the contact area is disposed in the thumb accommodation portion, and the touch areas are disposed in the finger accommodation portions other than the thumb accommodation portion.

* * * * *